United States Patent [19]

Marrujo et al.

[11] 4,186,964
[45] Feb. 5, 1980

[54] SEAT ARMREST

[75] Inventors: Ralph G. Marrujo, Winston-Salem; Thomas D. Hire, Lewisville, both of N.C.

[73] Assignee: Fairchild Industries, Inc., Germantown, Md.

[21] Appl. No.: 953,889

[22] Filed: Oct. 23, 1978

[51] Int. Cl.² .................................................. A47C 1/12
[52] U.S. Cl. ..................................... 297/422; 297/411
[58] Field of Search ....................... 297/411, 412, 422

[56] References Cited

U.S. PATENT DOCUMENTS

| | | | |
|---|---|---|---|
| 3,137,527 | 6/1964 | Hoven et al. | 297/422 X |
| 3,695,689 | 10/1972 | Barecki | 297/422 X |
| 4,027,916 | 6/1977 | McElroy | 297/422 X |
| 4,099,780 | 7/1978 | Schmidhuber | 297/411 |

*Primary Examiner*—James C. Mitchell
*Attorney, Agent, or Firm*—Michael W. York

[57] ABSTRACT

A multi-component seat armrest that is particularly suitable for use in connection with vehicle seats. The seat armrest includes two basic interconnectible shell members. These interconnected members have portions that are sized and shaped to fit into portions of a third member called an insert member. The insert member has an aperture extending through it and an armrest panel is provided that is adapted to fit into this aperture. The armrest panel is removable for cleaning or it can be removed and interchanged with a different type or color panel. The armrest is particularly adapted for use in connection with aircraft seats where it would serve as the armrest for the end of the seat located near the aisle of the aircraft.

11 Claims, 7 Drawing Figures

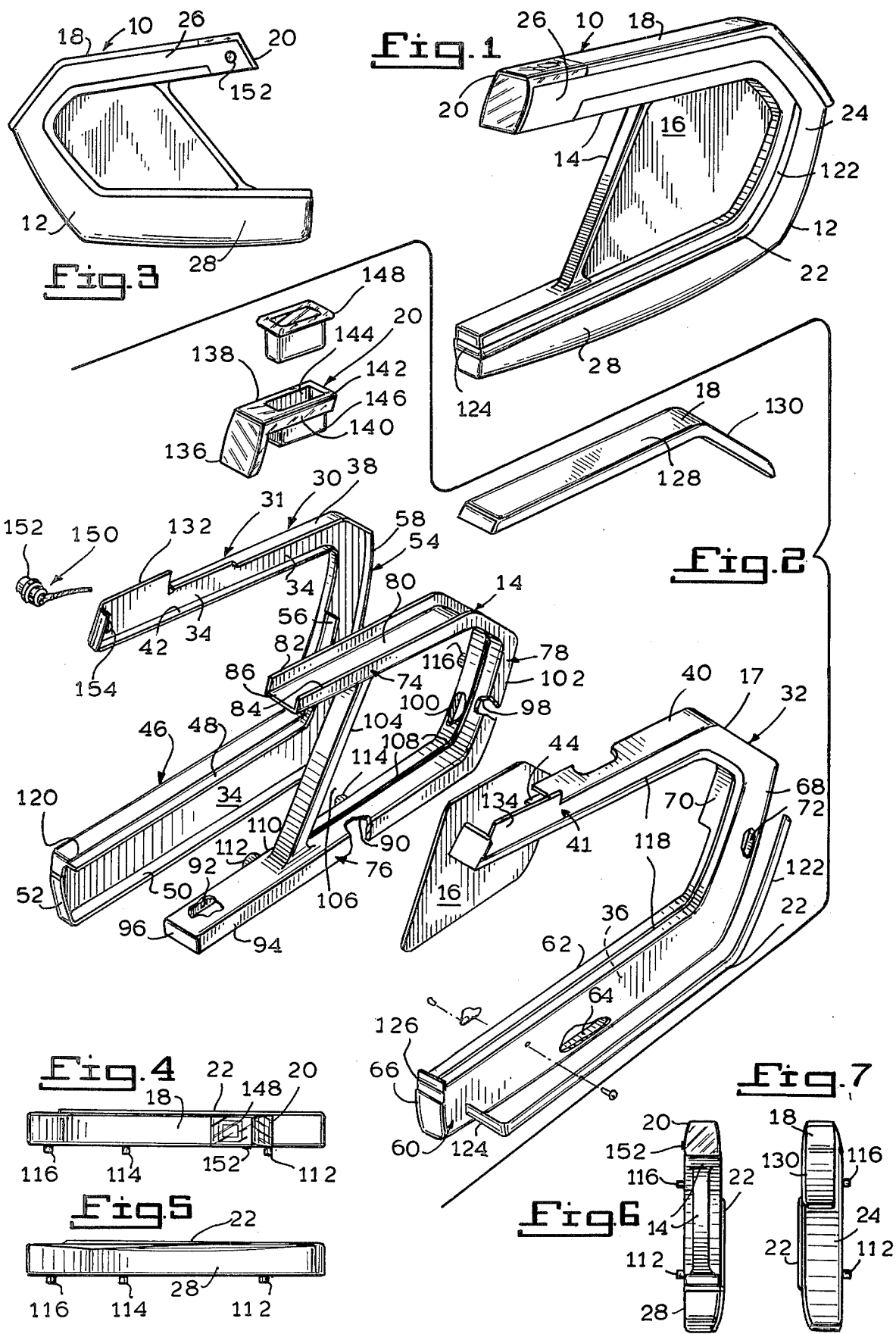

SEAT ARMREST

BACKGROUND OF THE INVENTION

For many years there has been a need to produce a low cost, simple seat. This has been particularly true in connection with vehicle seats such as those used on buses, trains and aircraft. In connection with aircraft seats, it is important that the seat in question be capable of withstanding large G loadings and yet be of minimum weight. It has also been desirable particularly with respect to aircraft seats to have as few components as possible since this minimizes the need for an inventory of excess parts and cuts down upon assembly time both of which contribute to the cost reduction.

One of the assemblies that is important for a vehicle seat such as an aircraft seat is the armrest that is to be located on the end of the seat located near the aisle. This armrest is commonly termed the end bay. Simplification of this armrest or end bay will result in cost savings and ease of manufacture. It would also be desirable to have an armrest or end bay that can be utilized with seats that are to be delivered to various airlines since this greatly reduces the cost associated with the seat and the lead time necesary to deliver seats for installation in the aircraft.

Unfortunately, at the present time most aircraft seats including the end bay or armrest are designed and manufactured for a particular airline and the aircraft in question. This, obviously, increases the cost of the seat and the armrest and results in duplication of efforts, excessive parts inventory and other problems.

The present invention overcomes all of the foregoing disadvantages and provides a seat armrest that is economical to manufacture and assemble, is capable of being utilized by numerous airlines and requires no excessive inventories of spare parts.

BRIEF DESCRIPTION OF THE INVENTION

This invention relates to seats and more particularly to the armrest portion of the seat.

It is an object of the present invention to provide for a seat that has a minimum of components.

It is an object of the present invention to provide an armrest for a seat that is easy to manufacture.

It is also an object of the present invention to provide an armrest for a seat which can be manufactured at a comparatively low cost.

It is also an object of the present invention to provide an armrest for a seat which is easy to assemble.

It is also an object of the present invention to provide an armrest for a seat that has a removable portion which is readily removable for cleaning or replacement.

It is a further object of the present invention to provide an armrest for a seat whose components can be readily removed for replacement due to damage.

It is a further object of the present invention to provide an armrest that is particularly adapted for use in connection with vehicle seats.

It is also an object of the present invention to provide an armrest that is particularly adapted for use in connection with aircraft seats.

It is an object of the present invention to provide an armrest for an aircraft seat that is adapted for utilization by various airlines.

It is also an object of the present invention to provide a seat armrest that is light in weight.

The present invention provides an armrest for a seat that includes a center member, a first outer member and a second outer member wherein the first outer member and the second outer member are connectible to the center member.

BRIEF DESCRIPTION OF THE DRAWINGS

The invention will be hereinafter more fully described with reference to the accompanying drawings in which:

FIG. 1 is a perspective view of the armrest portion of the seat of the present invention;

FIG. 2 is an exploded view of the structure illustrated in FIG. 1;

FIG. 3 is a side elevational view of the structure illustrated in FIGS. 1 and 2;

FIG. 4 is a top plane view of the structure illustrated in FIGS. 1 through 3;

FIG. 5 is a bottom plane view of the structure illustrated in FIGS. 1 through 4;

FIG. 6 is a front elevational view of the structure illustrated in FIGS. 1 through 5; and FIG. 7 is a rear elevational view of the structure illustrated in FIGS. 1 through 6.

DETAILED DESCRIPTION OF THE PREFERRED EMBODIMENT

Referring first to FIG. 1, the seat armrest of the invention is shown and is designated generally by the number 10. The armrest 10 comprises a hollow armrest or end bay assembly 12, an armrest or end bay insert 14, an armrest panel 16, an arm cap member 18, an escutcheon or protective end cap assembly 20, and a bumper strip member 22. The armrest assembly 12 has a generally C-shaped configuration with a rear portion 24 and respective upper and lower projecting portions 26 and 28 that project outward from the rear portion 24. The insert is located between the portions 24, 26 and 28 when the armrest 10 is assembled. The bumper strip 22 is connected to the lower and rear portions 28 and 24 when the armrest is in its assembled configuration. This bumper strip will be located on the side of the armrest that would normally be exposed to damage by abrasion, etc. such as that which might occur when food or beverage carts are pushed down the aisle of an aircraft. In addition, the bumper strip also has a decorative function. The arm cap member is located on the upper surface of the projecting portion 26 and a portion of the rear portion 24. The escutcheon 20 is located on the outer end of the upper portion 26 to provide protection to the outer end of this portion 26.

The armrest 10 is illustrated in greater detail in the exploded view of FIG. 2. As illustrated in FIG. 2, the armrest or end bay assembly 12 comprises two shell members designated generally by the numbers 30 and 32. These shell members 30 and 32 are adapted or configured to interconnect to form the assembled armrest or end bay assembly 12. The shell member 30 is configured to be located towards the inside of a seat whereas the shell member 32 is configured or adapted to be located towards the exterior of the seat. The shell members 30 and 32 have respective depressed portions 34 and 36. The shell member 30 has a flange 38 located on its upper portion 31 that extends outward from the depressed portion 34. In a similar manner, shell member 32 has a flange 40 located on its upper portion 41 which also extends outward from the depressed portion 36. The shell member 30 also has a lower upper flange 42 which is located below the flange 38 and also extends outward from the depressed portion 34. In a similar manner, shell member 32 also has a flange 44 that extends outward from the depressed portion 36 and which is also located immediately below the flange 40. The lower portion 46 of the shell member 30 has respective upper and lower flanges 48 and 50 and an end flange 52. All of these flanges, 48, 50 and 52, extend outward from the depressed portion 34. The central or rear portion 54 of the shell member 30 has respective inner and outer flanges 56 and 58 that extend outward from the depressed portion 34.

The lower portion 60 of the shell member 32 has respective upper and lower flanges 62 and 64 and an end flange 66 which all extend outward from the depressed portion 36. The central intermediate or rear portion 68 has respective inner and outer flanges 70 and 72 which extend outward from the depressed portion 36. The respective flanges 38, 42, 48, 50, 52, 56 and 58 of the shell member 30 are adapted to be interconnected or inserted into respective flanges 40, 44, 62, 64, 66, 70 and 72 of the shell member 32 to form the armrest or end bay assembly 12. It should be noted that these respective flanges can be joined by means well known in the art such as by bonding, cementing or riveting. In the preferred embodiment, the shell members 30 and 32 are made from a thermoplastic which permits their respective flanges to be readily bonded together.

As best illustrated in FIG. 2, the armrest insert 14 comprises an upper substantially U-shaped cross section channel portion 74, a lower substantially U-shaped cross section channel portion 76 and an intermediate interconnecting or rear channel portion 78 having a substantially U-shaped cross section that interconnects the channel portion 74 and 76. The upper channel portion 74 has a recessed or bottom portion 80 with flanges 82 and 84 extending upward from the portion 80. It should be noted that the forward portion 86 of the upper channel portion 74 is open. In a similar manner, the lower channel portion 76 has a recessed or bottom portion 90 with respective flanges 92 and 94 extending downward from this bottom portion 90. The forward portion of the lower channel portion 76 is closed by a downward extending flange 96. The interconnecting channel 78 has a bottom or depressed portion 98 with flanges 100 and 102 extending outward from this bottom portion. A rectangular connecting member 104 interconnects the upper channel portion 74 and the lower channel portion 76. The central axis of this connecting member 104 is at an angle with the planes of the bottom portions of 80 and 90 of the respective channel members 74 and 76. This connecting member 104 is located forward enough from the interconnecting channel portion 78 that it forms an aperture 106 that is adapted to receive the armrest panel 16. In order to retain the armrest panel 16 in place, a shallow groove 108 is provided in the outer periphery of aperture 106. It should be noted that the armrest panel is to a certain degree flexible or bendable and hence its outer edges can be forced into the groove 108 so that the panel 16 is retained in place in the aperture 106 of the insert 14. The inner side portion 110 or the side that faces the seat of the insert 14 is provided with three projecting members designated respectively by the numbers 112, 114 and 116 which are adapted to connect the insert member 14 and the entire armrest 10 to the seat in a conventional manner such as by screws, etc.

As best illustrated in FIG. 2, the shell member 32 has a recess 118 that extends around the inside of its inner exterior. In a similar manner, the shell member 30 has a substantially identical recess 120 that extends around the inside of its outer exterior. The purpose of these recesses 118 and 120 is to permit the interior of the various flanges 82, 84, 92, 94, 96, 100 and 102 to fit over these recesses 118 and 120 after the shell members 30 and 32 have been joined together and the armrest insert placed in position between the portions 26, 28 and 24 of the armrest or end bay assembly 12. The armrest insert 14 is connected to the armrest assembly 12 in a conventional manner such as by screws or the like.

As best illustrated in FIGS. 1 and 2 after the armrest assembly 12 has been assembled and the armrest insert secured in place an elongated bumper strip member 22 which has two end portions 122 and 124 can be secured in a conventional manner to the armrest shell 32. This is accomplished by positioning portion 124 of the bumper strip 22 around the forward end of the shell member 32 and positioning the bumper strip member 22 so that its slanted upward portion 122 contacts the outer portion of the rear portion 24 of the armrest assembly 12. The arm cap 18 that has a substantially flat rectangular forward portion 128 and a rear rectangular sloping portion 130' can be affixed in a conventional manner to the upper and upper rear surface of the armrest or end bay assembly 12. In accomplishing this, it should be noted that the under side of the rectangular portion 128 of the arm cap 18 will be connected to the surface 40 of the shell member 32. As illustrated in FIG. 2, the forward upper portions of the respective shell members 30 and 32 have an upward extending, slightly recessed flanges 132 and 134. The escutcheon assembly 20 is illustrated in greater detail in FIG. 2, and it should be noted that it has slightly sloping end portion 136 and respective side flanges 138 and 140. The upper surface 142 of the escutcheon assembly 20 has aperture 144 and a well 146 for removably receiving a conventional ash tray assembly 148. These flanges 138 and 140 are sized to fit over the respective flanges 132 and 134 of the respective shell members 30 and 32 when shell members are assembled so that escutcheon assembly provides protection to the forward portion of the upper portion 26 of the armrest and end bay assembly 12. In addition, of course, this escutcheon assembly 20 with its aperture 144 and well 146 provides a location for the conventional ash tray 148.

As best iillustrated in FIGS. 2 and 3, provision has been made in the armrest 10 for a recline assembly 150. As indicated in FIG. 3, a recline control assembly button 152 is provided in the interior of the upper portion 26 of the armrest assembly 12. In order to accommodate this button 152 as best illustrated in FIG. 2, an aperture 154 is provided in the forward upper end portion of the shell member 30. Other portions of the recline assembly 150 are routed through the interior of the upper channel portion 74 of the armrest insert 14 in order that the recline assembly button 152 of the recline assembly 150 can project outward from the upper portion 26 of the armrest or end bay assembly 12 when the armrest 10 is assembled.

FIGS. 4, 5, 6 and 7 illustrate respectively top, bottom, front and rear views of the armrest 10 and plainly illustrate the location and position of the mounting projections 112, 114 and 116. They also illustrate the location of the arm cap 18 and the bumper strip 22.

In order to make and utilize the armrest 10 invention, the two shell members 30 and 32 are formed from a suitable thermoplastic material by methods that are well known in the art. The armrest insert 14 in the preferred embodiment is formed from an aluminum casting or forging in a manner that is also well known in the art. The armrest panel 16 is formed from suitable materials that are well known in the art and sized so that its edges will fit into the groove 108 in the insert member 14. The arm cap member 18 is also formed from a suitable material such as various types of plastics that will provide comfort for the arm of the person who is using the armrest 10. The escutcheon assembly 20 is also formed from a suitable material such as aluminum by known techniques as is the ash tray 148.

The armrest 10 is assembled by interconnecting the respective flanges of the shell members 30 and 32. The insert member 14 is then placed in position so that the flanges of its channel members 74, 76 and 78 fit into the depressions 118 and 120 of the respective shell members 32 and 30. The insert is then connected to the armrest assembly 24 by means that are well known in the art. The arm cap member is suitably affixed by means known in the art to the upper rear portion of the armrest assembly 24 and the escutcheon assembly 20 is connected to the end portion of the upper projecting portion 26 of the armrest assembly 24, and the ash tray 148 is inserted into the aperture 144 of escutcheon assembly 20. The bumper strip 22 is also affixed to the outside of the shell member 32 through the use of screws or appropriate adhesive, etc. In this connection, it should be noted that the portion 124 of the bumper assembly 22 is positioned around the forward end of the lower portion 60 of the shell member 32. During the assembly of armrest 10, the recline assembly is suitably positioned so that its button 152 will protrude from the aperture 154 in the upper portion 31 of the shell member 30. During the appropriate stage in the manufacture of a seat, the armrest 10 will be connected to one end of the seat through the use of projections 112, 114 and 116 through conventional means such as bolts and the like.

Since the armrest 10 is manufactured from plastic and aluminum parts, it is not readily susceptible to damage and it is easy to clean. In addition, the elongated bumper strip member 22, which in the preferred embodiment is manufactured from a suitable hard plastic, also affords additional protection for the armrest 10 since it projects outward from the armrest 10 outer surface so that it will come in contact with objects such as serving carts and the like that might bump up against the outside of the armrest 10. As previously indicated, the armrest panel 16 is removable from the aperture 106 in the insert 14 by applying suitable lateral manual force to the panel 16, so that the edges are forced out of the groove 108. This panel 16 can then be cleaned or replaced if desired. As indicated in FIG. 1, the armrest panel 16 can have a suitable logo located on its exterior surface to identify a particular airline, railroad or bus line. In this connection, it should be noted that the armrest 10 can be used for a variety of airlines, bus lines or other transportation companies by merely replacing or providing a suitable armrest panel member 16 that has the appropriate color and/or logo that designates or is associated with that particular airline, bus line or other transportation company. This, of course, eliminates the need to design a totally new armrest for each airline, bus line or transportation company and hence results in considerable savings in time and money. Moreover, problems associated with spare parts are greatly reduced or eliminated since all of the parts of the armrest 10 with the exception of the armrest panel 16 are interchangeable with the armrest parts of a wide variety of airlines, bus lines and other transportation companies that have this type of armrest 10.

Although the invention has been described with reference to a certain preferred embodiment, it will be understood that variations and modifications may be made within the spirit and the scope as defined in the appended claims.

What is claimed is:

1. An armrest for a seat comprising a first shell member and a second shell member, said first and said second shell members being interconnected to form a hollow structure having a rear portion, an upper projecting portion that extends outward from said rear portion, a lower projecting portion that extends outward from said rear portion, said first and said second shell members having means for receiving an armrest insert member, and an armrest insert member positioned between said upper projecting portion and said lower projecting portion, said armrest insert member having an upper portion and a lower portion and a rear portion that interconnects said upper and said lower portions of said armrest insert member, said armrest insert member having means for connecting said armrest to said seat.

2. The armrest of claim 1 further comprising a connecting member interconnecting said upper and said lower portions of said armrest insert member, said connecting member being located forward from said rear portion of said armrest insert member.

3. The armrest of claim 2 wherein said armrest insert member has an aperture extending therethrough.

4. The armrest of claim 3 wherein said connecting member of said armrest insert member partially bounds the aperture in said insert member.

5. The armrest of claim 4 further comprising a panel member adapted to be insertable into the aperture in said armrest insert member.

6. The armrest of claim 1 wherein said upper and said lower portions of said armrest insert member have flanges.

7. The armrest of claim 6 wherein said rear portion of said armrest insert member has flanges.

8. The armrest of claim 7 wherein said means for receiving an armrest insert member comprise recesses in said first and said second shell members located to permit said flanges of said upper, lower and rear portions of said armrest insert member to fit over said recesses.

9. The armrest of claim 7 wherein said upper, lower and rear portions of said armrest insert member have a substantially U-shaped cross section.

10. The armrest of claim 1 wherein said means for connecting said armrest to said seat is located on the inner side portion of said armrest insert member.

11. The armrest of claim 10 wherein said means for connecting said armrest to said seat comprises projecting members.

* * * * *